United States Patent [19]

Denison et al.

[11] Patent Number: 4,761,819
[45] Date of Patent: Aug. 2, 1988

[54] ADAPTIVE NOISE REDUCTION FILTER FOR RECONSTRUCTED IMAGES

[75] Inventors: Kenneth S. Denison, Shaker Hts.; William Sattin, Cleveland Hts., both of Ohio

[73] Assignee: Picker International, Inc., Highland Hts., Ohio

[21] Appl. No.: 19,567

[22] Filed: Feb. 27, 1987

[51] Int. Cl.$^4$ .............................................. G06K 9/40
[52] U.S. Cl. ...................................... 382/54; 382/6; 358/111
[58] Field of Search ................... 382/6, 54; 358/111; 364/414, 724

[56] References Cited

U.S. PATENT DOCUMENTS

| | | | |
|---|---|---|---|
| 4,463,375 | 7/1984 | Macovski | 358/111 |
| 4,499,493 | 2/1985 | Nishimura | 358/111 |
| 4,503,461 | 3/1985 | Nishimura | 358/111 |
| 4,504,908 | 3/1985 | Riederer et al. | 358/111 |
| 4,507,681 | 3/1985 | Verhoeven et al. | 358/111 |
| 4,590,582 | 5/1986 | Umemura | 358/111 |
| 4,648,120 | 3/1987 | Chittineni | 382/54 |

OTHER PUBLICATIONS

"Digital Image Enhancement: A Survey", by Wang et al., Computer Vision, Graphics & Image Processing, 24, 1983, pp. 363–381.

"Digital Image Processing by use of Local Statistics", by Jong-Sen Lee, Naval Research Laboratory, pp. 55–61.

"A Signal-to-Noise Calibration Procedure for NMR Imaging Systems", by Edelstein et al., Med. Phys. 11(2), Mar./Apr. 1984, pp. 180–185.

"Measurement-Dependent Filtering: A Novel Approach to Improved SNR", by Macovski et al., IEEE Transactions on Medical Imaging, vol. M1-2, No. 3, Sep. 1983, pp. 122–127.

"Noise Cleaning", from Digital Image Processing.

"Nonstationary Statistical Image Models and Their Application to Image Data Compression", by Hunt, Image Modeling, 1980, 1981, pp. 225–239.

Primary Examiner—Leo H. Boudreau
Assistant Examiner—Donald J. Daley
Attorney, Agent, or Firm—Fay, Sharpe, Beall, Fagan, Minnich & McKee

[57] ABSTRACT

An MRI or other scanner (A) generates medical diagnostic data d(x,y) which has a Gaussian noise distribution for reconstruction by an imager (B) into an electronic image representation P(i,j) which may have a Gaussian or Rayleigh noise distribution. An image improving circuit (C) replaces each image pixel value P(i,j) from an image reconstruction means (32) with an improved pixel value P*(i,j) defined as follows:

$$P^*(i,j) = G(i,j)[\bar{P}(i,j) - P(i,j)] + \bar{P}(i,j) - \bar{n},$$

where G(i,j) is a weighting function uniquely defined for each pixel (i,j), $\bar{P}$ is the mean of pixel values of neighboring pixels and $\bar{n}$ is the mean image noise. The weighting function is based on a diagnostic data noise variance and a pixel value variance V(i,j) corresponding to the same pixel. The data noise variance is derived by comparing a data value difference between each data value d(x,y) and its neighboring data values in a data memory (30). The smallest data value difference is indicative of the image noise variance. Each pixel variance is indicative of the difference between a corresponding pixel value and the neighboring pixel values. Preferably, the weighting function is:

$$G(i,j) = \frac{V(i,j)}{V(i,j) + V(\text{noise})}$$

For a Gaussian image noise distribution:
$V(\text{noise}) = \sigma_g^2$
$\bar{n} = 0.$ For a Rayleigh image noise distribution:
$V(\text{noise}) = (2 - \pi/2)\sigma_g^2$
$\bar{n} = (\pi/2)^{\frac{1}{2}}\sigma_g$

21 Claims, 1 Drawing Sheet

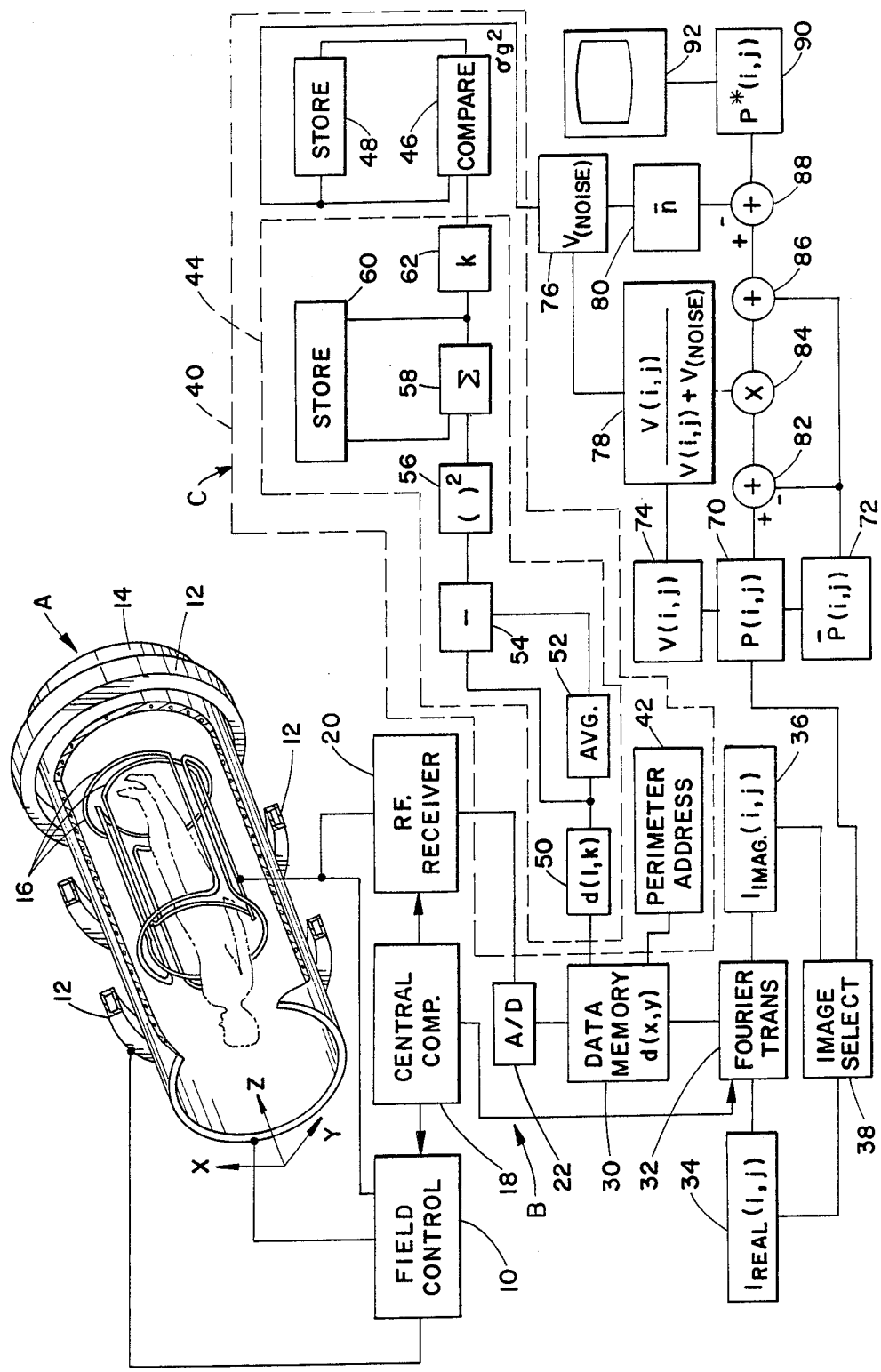

ADAPTIVE NOISE REDUCTION FILTER FOR RECONSTRUCTED IMAGES

BACKGROUND OF THE INVENTION

The present invention relates to the art of image processing. It finds particular application in conjunction with image enhancement, image smoothing, and other image improvement techniques for magnetic resonance images and will be described with particular reference thereto. It is to be appreciated, however, that the present invention is also applicable to improving digital x-ray images, computed tomographic images, nuclear camera images, positron emission scanners, and the like.

Medical diagnostic images have commonly been subject to image degradation from noise, system imperfections, and the like. Various image processing techniques have been utilized to remove the effects of the noise. See for example, "Digital Image Enhancement: A Survey" Wang, et al., Computer Vision, Graphics, and Image Processing, Vol. 24, pages 363–381 (1983). In one technique, each pixel was adjusted in accordance with the mean of surrounding pixels and the variance or difference between the surrounding pixels. Each filter enhanced pixel value g'(i,j) was a weighted average of the local mean and variance values:

$$g'(i,j) = \bar{g}(i,j) + k[g(i,j) - \bar{g}(i,j)] \quad (1),$$

where $\bar{g}(i,j)$ was the local mean, $g(i,j) - \bar{g}(i,j)$ was the variance, and k was a constant that weighted the relative contributions therebetween. It is to be appreciated that when k was set larger than 1, the variance or difference between the local mean value, hence the contribution of the measured gray scale level of the pixel (i,j) was magnified. As k was set smaller, the image was smoothed or blurred as if acted upon by a low-pass filter. At the extreme at which k was set equal to zero, each pixel value was replaced by the local mean of the neighboring pixel values.

One of the drawbacks in this technique resided in selecting an appropriate value for the weighting factor k. The smaller k was set, the more the image was blurred and the more difficult it became to withdraw accurate diagnostic information. As k was set larger, edges and fine details, including noise, became enhanced. Frequently, in a medical image, the selected weighting factor k was too large for some regions and too small for other regions.

"Digital Image Processing by Use of Local Statistics" by J. S. Lee, Naval Research Laboratory, Washington, D.C. (1980), recognized that a different weighting factor k could be selected for each pixel to be enhanced. Specifically, Lee suggested setting the k for each pixel equal to the square root of the ratio of a preselected desirable local variance to the actual local variance of the selected pixel. Although the Lee pixel variable weighting factor achieved better resultant images than the constant weighting factor, there was still room for improvement.

In accordance with the present invention, a new and improved filtering technique is provided.

SUMMARY OF THE INVENTION

In accordance with one aspect of the present invention, a method of improving images is provided. A body of image data is collected and noise statistics thereof are determined. The collected data is converted into an electronic image representation which includes an array of pixel values. For each pixel value, a variance between the pixel value and neighboring pixel values is determined and an average of the neighboring pixel values is determined. An improved electronic image is provided by replacing each pixel value of the array by a combination of the replaced pixel value and the above determined average of the pixel values neighboring the replaced pixel value. The relative contributions of the pixel value and the neighboring pixel value average are weighted in accordance with the determined image data noise statistics and the variance or noise level at each pixel.

In accordance with another aspect of the present invention, a medical imaging apparatus is provided. A medical diagnostic apparatus provides electronic diagnostic data for reconstruction into an image representation. A noise statistic determining means determines noise statistics of the data collected for each individual image representation. A transform means transforms the diagnostic data into an electronic image representation. A mean neighborhood value determining means determines an average value of pixels in the neighborhood of each pixel of the image representation. A variance means determines the variance between each pixel and the other pixel values in its neighborhood. A combining means combines each pixel value with its corresponding mean or average pixel value. The relative contribution of each is weighted in accordance with the image noise statistics calculated by the noise statistics calculating means and in accordance with the variance for the corresponding pixel.

A first advantage of the present invention is that it provides a highest appropriate filtering level for each individual image. Because the filter function is image noise dependent, more noise free images are not overfiltered or blurred unnecessarily.

Another advantage of the present invention is that it is regionally adaptive. That is, noiser regions of the image are filtered more than regions of each image with less noise.

Other advantages of the present invention reside in an improved technique for determining image wide noise, in achieving an improved signal-to-noise ratio without a loss of spatial resolution, and in an improved technique for determining image noise before image reconstruction.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

The FIGURE is a diagrammatic illustration of a medical diagnostic imaging apparatus in accordance with the present invention.

DETAILED DESCRIPTION OF THE PREFERRED EMBODIMENT

With reference to the FIGURE, a medical diagnostic apparatus A generates medical diagnostic data which is reconstructed by an imager B into an electronic image representation. An adaptive filter circuit C operates on the electronic image representation to improve the image quality and viewability thereof.

Although a magnetic resonance imager is illustrated, the medical diagnostic apparatus A may be computerized tomographic scanner, a digital x-ray apparatus, a positron emission scanner, a nuclear camera, or other diagnostic apparatus which generates data that is able to be reconstructed into an image representative of a region of an examined patient or subject. The illustrated magnetic resonance imager includes a field control means 10 which controls a main, homogeneous polarizing magnetic field through an image region generated by electromagnets 12. The field control means 10 also controls gradient magnetic fields created across the image region by gradient field coils 14 to provide spatial encoding, phase encoding, and slice select gradients. The field control means 10 further generates radio frequency electromagnetic excitation signals which are applied to radio frequency coils 16 to excite resonance of dipoles in the image region. A central computer 18 controls the relative timing and strengths of the gradient and radio frequency electromagnetic fields.

Magnetic resonance signals generated by resonating dipoles in the image region are received by the radio frequency coils and conveyed to a radio frequency receiver 20. The radio frequency receiver 20 demodulates the received signals which are converted from analog to digital format by an A/D converter 22. The ditigal format magnetic resonance medical diagnostic data is supplied to the imager B.

The imager B under control of the central computer 18 reconstructs the medical diagnostic data into an electronic image representation. More specifically, the imager B reconstructs the diagnostic data which has minor noise components into an array of digital pixel values which are degraded by the noise. Each pixel value corresponds to a preselected subregion of the image region, conventionally a corresponding voxel or cubic subregion of an imaged slice. The imager includes a diagnostic data memory 30 which stores the diagnostic data from the A/D converter 22. The diagnostic data from magnetic resonance echoes are reconstructed into a single image representation. More specific to the preferred embodiment, each echo signal or view is converted into a line of ditigal values for a data matrix d(x,y). With Gaussian noise as is found in a magnetic resonance imager, each data matrix value is the sum of a data component and a noise component.

The diagnostic data memory 30 stores the diagnostic data in the data matrix format until a sufficient amount of data is received for a complex two dimensional Fourier transform means or routine 32 to transform the received data into a real image representation for storage in a real image memory 34 and an imaginary image representation for storage in an imaginary image memory 36. The sum of a data matrix value and Gaussian noise, $d(x,y) + n_g$, Fourier transforms linearly into the sum of an image pixel value and Gaussian noise, $I(i,j) + n'_g$. A real, imaginary, or magnitude image means 38 transfers either real, imaginary, or magnitude pixel values as may be selected by the operator to the filtering means C. If the real image is selected, the contents of the real image memory 34 are transferred. If the imaginary image is selected, the contents of the imaginary memory 36 are transferred. The real and imaginary images again have a Gaussian noise distribution. If a magnitude image is selected, an array of magnitude pixel values is transferred. Each magnitude pixel value is set equal to the square root of the sum of the squares of the corresponding real and imaginary image pixel values, i.e. $(I(real)^2 + I(imaginary)^2)^{\frac{1}{2}}$. The magnitude image has a Rayleigh noise distribution.

The algorithm implemented by the reconstruction means is, of course, selected in accordance with the medical diagnostic apparatus selected. For other diagnostic imagers, other known transform and reconstruction techniques are selected.

The filtering circuit C includes an image noise level determining means 40 which calculates a value V(noise) which is indicative of the noise level of the diagnostic data or the overall image. In magnetic resonance and many other applications, the diagnostic data stored in memory 30 has substantially signal-independent, uncorrelated additive noise. This enables image noise statistics to be determined from the data noise statistics. In magnetic resonance imaging in which the diagnostic data is a Fourier transform of the image, the noise is primarily signal-independent, uncorrelated, and additive.

The noise statistics of the data are readily determined from an area of the data which contains no diagnostic data or signal, merely noise. In some applications, such a region may be created artificially by appropriate placement of the patient, inclusion of phantom or phantom regions, adjustment of the imaging sequence, or the like. However, in conventional Fourier transform magnetic resonance imaging, the majority of the signal is concentrated in the center of the data matrix d(x,y) stored in memory 30. Accordingly, the probability of finding a signal-free region is greatest around the periphery of the data matrix. In the preferred embodiment, the data around the periphery of the data matrix is examined for uniformity. The most uniform region is assumed to be a region with substantially no signal, just noise. The degree of non-uniformity in this region is utilized as the indicator of overall image noise.

A matrix addressing means 42 serially addresses each of a plurality of preselected data matrix points (x,y) around the periphery of the data matrix. At each matrix point, a variance means 44 determines the variance V(x,y) between the data values corresponding to the addressed matrix point and its neighboring matrix points. In the preferred embodiment, the noise at each point V(x,y) is determined from the equation:

$$V(x,y) = \frac{1}{(2a+1)(2b+1)} \sum_{l=x-a}^{x+a} \sum_{k=y-b}^{y+b} [d(l,k) - \bar{d}(x,y)]^2, \quad (2)$$

where d(l,k) represents the data values surrounding the matrix point (x,y) and $\bar{d}(x,y)$ is the average of data values surrounding the data point d(x,y). Each local data variance V(x,y) is compared by a comparing means 46 with a previously measured variance stored in a memory 48. The smaller of the two variances is returned to the memory 48 and stored for the next comparison. In this manner, the neighborhood of the data matrix with the least signal is determined. For Gaussian noise, the noise variance is equal to the square standard deviation for Gaussian noise $\sigma_g^2$.

In the preferred embodiment, the data matrix variance determining means 44 includes a means 50 for serially receiving the data value from each point surrounding matrix point (x,y), and an averaging means 52 for determining the average of the neighboring data values. The neighboring points are again addressed serially. A subtraction means 54 determines the difference between each neighboring point data value and the average. A squaring means 56 squares the difference and a summation means 58 sums the square of the difference with the accumulated sum in a cumulative memory 60. The weighting means 62 adjusts the sum by a constant to compensate for the size of the neighborhood or the like.

The filtering means C further includes a first pixel memory 70 which receives pixel values P(i,j) from the reconstruction means. As discussed above, the pixel values may be the real image pixel values, the imaginary image pixel values or the magnitude image pixel values.

A pixel value average or mean determining means 72 determines the mean or average of pixel values surrounding each pixel (i,j) of the pixel memory 70. In the preferred embodiment, the pixel mean value $\bar{P}(i,j)$ is determined in accordance with:

$$\bar{P}(i,j) = \frac{1}{(2n+1)(2m+1)} \sum_{l=i-n}^{i+n} \sum_{k=j-m}^{j+m} P(l,k), \quad (3)$$

where the values of the constants n and m indicate the size of the neighborhood.

A pixel value variance determining means 74 determines the variance V(i,j) corresponding to the neighborhood around each pixel (i,j). In the preferred embodiment, the variance is determined in accordance with:

$$V(i,j) = \frac{1}{(2n+1)(2m+1)} \sum_{l=i-n}^{i+n} \sum_{k=j-m}^{j+m} [P(l,k) - \bar{P}(i,j)]^2. \quad (4)$$

A data noise to image noise converting means 76 converts the Gaussian data noise variance to an image noise variance V(noise). For Gaussian image noise, the image noise variance is equal to the data noise variance. For Rayleigh image noise, the image noise variance is equal to the Gaussian data noise variance times the constant $(2-\pi/2)$. For other image noise distributions, the data noise may be operated on by other constants or functions.

A weighting factor determining means 78 determines a weighting factor G(i,j) corresponding to each pixel location in accordance with the corresponding pixel variance V(i,j) and the image noise level V(noise). In the preferred embodiment, the weighting factor is determined in accordance with:

$$G(i,j) = \frac{V(i,j)}{V(i,j) + V(\text{noise})}. \quad (5)$$

In most instances, the noise variance V(noise) will be less than or equal to the local variance V(i,j). When the noise variance of the image is very low, the weighting factor approaches one. As the noise variance increases toward the local variance, the weighting factor becomes smaller approaching one half. If the local variance is less than the noise variance, the weighting factor will become less than one-half and approach zero.

It must be noted that the noise variance is individually selected for each image and is normally different from image to image. Thus, the weighting factor at pixels in two images with the same local variance is commonly different due to the different noise variance of the two images. Optionally, other weighting factors which weight in accordance with both the local variance and the image noise variance may be selected.

A mean noise determining means 80 determines the mean magnitude of the image noise correction value $\bar{n}$. A Gaussian noise distribution has a zero mean magnitude, whereas a Rayleigh distribution does not. When a real, imaginary or other image with a Gaussian noise distribution is being processed, the mean noise is zero, i.e. $\bar{n}=0$. When a magnitude or other image with a Rayleigh noise distribution is being processed, the mean noise $\bar{n}$ is:

$$\bar{n} = \left(\frac{\pi}{2}\right)^{\frac{1}{2}} \sigma g. \quad (6)$$

Other mean noise values can be calculated for other noise distributions as is known in the art.

A first subtraction means 82 subtractively combines each pixel value, P(i,j) with the corresponding average neighborhood pixel value, $\bar{P}(i,j)$. A multiplying means 84 multiplies the difference of the pixel and neighborhood values by the weighting factor corresponding to the same pixel G(i,j). An adding means 86 adds the corresponding neighborhood average to the weighted difference. A second subtracting means 88 subtracts the mean noise correction value from the sum. This sum is stored in a filtered image memory 90 and displayed on a video monitor or other display means 92. That is, each filtered pixel value P*(i,j) is equal to:

$$P^*(i,j) = \bar{P}(i,j) + \frac{V(i,j)[P(i,j) - \bar{P}(i,j)] - \bar{n}}{V(i,j) + V(\text{noise})}. \quad (7)$$

With this relationship, with less data noise variance, the corresponding pixel value P(i,j) is weighted most heavily. Similarly, in a local region with alot of variance, the actual pixel value is again weighted heavily so as not to blur the local resolution. However, in images that are very noisy or in regions that are very uniform, the neighborhood average is weighted more heavily.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A method of medical diagnostic imaging comprising:
    collecting medical diagnostic data;
    determining noise statistics of the collected diagnostic data;
    converting the collected diagnostic data into an electronic image representation which includes an array of pixel values;
    for each pixel value determining (i) a variance between the pixel value and neighboring pixel values and (ii) an average of the neighboring pixel values;
    providing an improved electronic image representation by replacing each pixel value of the array by a weighted combination of the replaced pixel value and the average of pixel values neighboring the replaced pixel value, the weighting being in accordance with the determined noise statistics and the variance between the replaced pixel value and its neighboring pixel values.

2. The method as set forth in claim 1 wherein the step of determining the noise statisics of the collected diagnostic data includes:
 digitizing the collected data and storing the digitized data in a data memory;
 determining a data variance between each of a plurality of data values stored in the data memory and its neighboring data values;
 comparing each determined data variance with previously determined data variances to determine a minimum data variance, the minimum data variance being indicative of the noise statistics, whereby a noise variance of the collected diagnostic data is determined.

3. The method as set forth in claim 2 wherein the data variance determining step is performed only on selected data values whose surrounding data values have a higher probability of representing substantially no signal such that the data variance is primarily indicative of noise variance rather than imaged structure.

4. The method as set forth in claim 2 further including:
 generating the medical diagnostic data with a magnetic resonance imager;
 organizing the digitized data values in the data memory in a rectangular matrix array; and,
 in the noise variance determining step, determining the variance of data values disposed generally around the periphery of the matrix.

5. The method as set forth in claim 1 wherein the weighting is proportional to a ratio of a corresponding data value variance to a sum of a corresponding pixel value variance and the determined noise statistics.

6. The method as set forth in claim 1 wherein the combining step includes subtractively combining replaced pixel values with the average of neighboring pixel values and multiplying the difference with a weighting function, the weighting function being determined in accordance with the determined noise statistics and the pixel value variance between the replaced pixel and its neighboring pixel values.

7. The method as set forth in claim 6 wherein the weighting value is proportional to a ratio of the pixel value variance corresponding to the replaced pixel and the determined noise statistics.

8. The method as set forth in claim 7 wherein the combining step further includes summing the average of pixel values neighboring the replaced pixel value with the weighted difference.

9. The method as set forth in claim 8 further including:
 determining a mean noise level value from the determined noise level; and,
 wherein the combining step further includes subtracting the mean noise level value from the weighted difference.

10. A method of imaging comprising:
 measuring a data noise statistic from collected data;
 converting the collected data into an electronic image representation which includes an array of pixel values;
 for each pixel value determining (i) a variance between the pixel value and neighboring pixel values and (ii) an average of the neighboring pixel values;
 determining a weighting value from the determined data noise statistic and the variance between the pixel value and its neighboring pixel values;
 combining each pixel value with the average of its neighboring pixel values;
 weighting the combination with the weighting value.

11. A method of imaging comprising:
 determining a data noise statistic of collected data;
 converting the collected data into an electronic image representation which includes an array of pixel values;
 determining an image mean noise from the determined data noise statistic;
 for each pixel value, determining an average neighboring pixel value;
 replacing each pixel value with a combination of the replaced pixel value itself, the average of its neighboring pixel values, and the mean noise.

12. The imaging method as set forth in claim 11 wherein the step of determining the data noise statistic includes determining a data value variance between at least one data value of the collected data and its neighboring data values.

13. The imaging method as set forth in claim 12 wherein the image mean noise is proportional to a square root of the determined data value variance.

14. A medical imaging apparatus comprising:
 a medical diagnostic apparatus for generating medical diagnostic data indicative of at least a selected region of an examined patient;
 a diagnostic data memory means for storing diagnostic data from the medical diagnostic apparatus;
 a data noise statistic determining means for determining a noise statistic of the diagnostic data, the data noise statistic determining means being operatively connected with a diagnostic data memory means;
 a transform means for converting the diagnostic data from the diagnostic data memory means into an electronic image representation which includes an array of pixel values;
 an average pixel value determining means for determining an average pixel value of pixel values neighboring each pixel value;
 a combining means for combining each pixel value with the corresponding pixel value average and the data noise statistic, the combining means being operatively connected to the data noise statistic determining means, the transform means, and the average pixel value determining means.

15. The apparatus as set forth in claim 14 further including:
 a variance determining means for determining a variance between each pixel value and its neighboring pixel values;
 a weighting function determining means for determining a weighting function for each pixel value in accordance with (i) the data noise level from the noise level determining means and (ii) the variance corresponding to the same pixel value; and,
 wherein the combining means weights a combination of each pixel value and the corresponding average pixel value with the weighting function.

16. The apparatus as set forth in claim 14 wherein the combining means includes:
 a subtraction means for subtractively combining each pixel value with its corresponding average of neighboring pixel values;

means for weighting the difference from the subtractive combining means with the weighting factor; and, an adding means for combining the corresponding average of neighboring pixel values with the weighted difference.

17. The apparatus as set forth in claim 14 further including:

an analog-to-digital converter for digitizing the diagnostic data; and, wherein the data memory means stores the digitized data values in a rectangular matrix array.

18. The apparatus as set forth in claim 17 wherein the medical diagnostic apparatus is a magnetic resonance imager, wherein the digital data values around a periphery of the data memory matrix tend to have a smaller signal contribution and further including:

a data memory addressing means for addressing the data values around the periphery of the matrix;

a data variance determining means for determining a data valuevariance between each addressed matrix value and its neighboring matrix values; and, a comparing means for comparing each determined data value variance of previously addressed data points, the smallest of the determined data value variances being the data noise statistic, the comparing means being operatively connected with the weighting factor determining means for supplying the smallest data value variance thereto.

19. The apparatus as set forth in claim 14 further including:

a mean image noise determining means for determining a mean image noise value from the data noise statistic; and, wherein the combining means subtracts the mean image noise value from the combination of each pixel value and the corresponding pixel value average.

20. The apparatus as set forth in claim 14 further including an improved image memory for storing a plurality of image pixel values, the improved image memory means being operatively connected with the combining means for receiving the combined pixel values therefrom to be stored in a corresponding pixel location.

21. A imaging apparatus comprising:

a apparatus for generating data indicative of at least a selected region of an examined patient;

a data memory means for storing data from the apparatus;

a data noise statistic determining means for determining a noise statistic value of collected data, the data noise statistic determining means being operatively connected with a data memory means;

a transform means for converting the collected data from the data memory means into an electronic image representation which includes an array of pixel values;

a variance determining means for determining a variance between each pixel value and its neighboring pixel values;

an average pixel value determining means for determining an average pixel value of pixel values neighboring each pixel value;

a weighting function determining means for determining a weighting function for each pixel value in accordance with (i) the data noise statistic value from the data noise statistic determining means and (ii) the variance corresponding to the same pixel value; and, a combining means for combining each pixel value with the corresponding pixel value average and for weighting the combination with the weighting factor.

* * * * *